US008727419B2

(12) United States Patent
Syvret et al.

(10) Patent No.: US 8,727,419 B2
(45) Date of Patent: May 20, 2014

(54) WINDOW ASSEMBLIES FOR VEHICLES, AND DOOR ASSEMBLIES AND VEHICLES INCLUDING THE SAME

(75) Inventors: Andrew John Syvret, Warwick (GB); Adrian Charles Morgan Jenkins, Warwick (GB); William Manuel Walsh, Warwick (GB)

(73) Assignee: Aston Martin Lagonda Limited, Gaydon (GB)

( * ) Notice: Subject to any disclaimer, the term of this patent is extended or adjusted under 35 U.S.C. 154(b) by 69 days.

(21) Appl. No.: 13/321,514

(22) PCT Filed: May 20, 2010

(86) PCT No.: PCT/GB2010/001018
§ 371 (c)(1),
(2), (4) Date: Feb. 13, 2012

(87) PCT Pub. No.: WO2010/133850
PCT Pub. Date: Nov. 25, 2010

(65) Prior Publication Data
US 2012/0133174 A1    May 31, 2012

(30) Foreign Application Priority Data

May 20, 2009   (GB) .................................. 0908721.4

(51) Int. Cl.
*B60J 10/02*        (2006.01)
(52) U.S. Cl.
USPC ...................................................... 296/146.2
(58) Field of Classification Search
USPC ................. 296/146.2, 146.15, 146.16, 146.1, 296/146.9, 201, 203.03; 49/502
See application file for complete search history.

(56) References Cited

U.S. PATENT DOCUMENTS 2,253,805 A * 8/1941 Olivier ............................ 49/145
2,863,658 A * 12/1958 Moyes ........................... 49/73.1
(Continued)

FOREIGN PATENT DOCUMENTS

DE           3428610       8/1984
DE           3635924       5/1988
(Continued)

OTHER PUBLICATIONS

United Kingdom Search Report dated Aug. 28, 2009, GB 0908721.4, 3 pages.

(Continued)

*Primary Examiner* — Kiran B Patel
(74) *Attorney, Agent, or Firm* — Dorsey & Whitney LLP (57) ABSTRACT

A window assembly (118) comprises: a window regulator (144) for driving a main window (124) up and down, a connection system (196) with a latch (198), a division bar (122), and quarter-light window (206) which may be driven down by the regulator (144) to a controlled index position at which the latch (198) disengages such that the quarter-light may be left in a slightly lowered index position while the main window may be further lowered, the latch reengaging once the main window is raised again, the raising and lowering of the quarter-light window (120) enabling the quarter-light to securely engage with a seal (246) positioned between its top edge (204) and an A-pillar (106) of the vehicle (100) and also allowing a door to which the assembly to be opened and closed without interference between the quarter-light and the seal (246).

20 Claims, 4 Drawing Sheets

(56) References Cited

U.S. PATENT DOCUMENTS

| | | | |
|---|---|---|---|
| 2,955,817 A * | 10/1960 | Campbell et al. | 49/103 |
| 3,273,285 A * | 9/1966 | Champion | 49/40 |
| 3,670,454 A | 6/1972 | Gebhard et al. | |
| 3,733,748 A * | 5/1973 | Heesch | 49/103 |
| 3,788,005 A * | 1/1974 | Mistopoulos, Jr. | 49/103 |
| 3,816,963 A * | 6/1974 | Hartmeyer et al. | 49/103 |
| 4,502,248 A * | 3/1985 | Thomas et al. | 49/374 |
| 4,729,592 A * | 3/1988 | Tuchiya et al. | 296/116 |
| 4,761,916 A * | 8/1988 | Sanok et al. | 49/381 |
| 4,776,630 A * | 10/1988 | Fukutomi et al. | 296/107.17 |
| 4,796,943 A * | 1/1989 | Fukutomi et al. | 296/65.18 |
| 4,811,517 A * | 3/1989 | Eckert et al. | 49/145 |
| 4,828,317 A * | 5/1989 | Muscat | 296/122 |
| 4,842,327 A * | 6/1989 | Hennessy | 296/201 |
| 5,456,516 A * | 10/1995 | Alexander et al. | 296/146.14 |
| 5,593,202 A * | 1/1997 | Corder et al. | 296/108 |
| 5,685,596 A * | 11/1997 | Tokarz et al. | 296/107.07 |
| 6,803,733 B1 * | 10/2004 | Shabana et al. | 318/280 |
| 2010/0156138 A1* | 6/2010 | Terai et al. | 296/146.3 |

FOREIGN PATENT DOCUMENTS

| | | |
|---|---|---|
| GB | 1311934 | 3/1973 |
| GB | 1418255 | 12/1975 |
| JP | 55004212 | 6/1978 |

OTHER PUBLICATIONS

International Search Report and Written Opinion dated Nov. 30, 2010, PCT/GB2010/001018, 11 pages.

* cited by examiner

WINDOW ASSEMBLIES FOR VEHICLES, AND DOOR ASSEMBLIES AND VEHICLES INCLUDING THE SAME

This application is the national stage application of PCT Patent Application No. PCT/GB2010/001018 filed May 20, 2010, and entitled, "Window Assemblies for Vehicles, and Door Assemblies and Vehicles Including the Same," which claims priority to United Kingdom Application No. GB 0908721.4 filed May 20, 2009, both of which are hereby incorporated by reference herein in their entireties The present invention relates to window assemblies for vehicles as well as door assemblies including such window assemblies and vehicles including such window or door assemblies. The present invention is particularly applicable in motor cars of the type having two or more passenger doors, including sports cars and grand tourer motor cars, convertibles, saloons and SUVs having two or four passenger doors. The invention is also particularly applicable in frameless window assemblies for motor vehicles of the type in which, when a vehicle door bearing such a window assembly is opened, there is no fixed frame member attached to the door which runs along the top edge of the window assembly.

Figure 2:
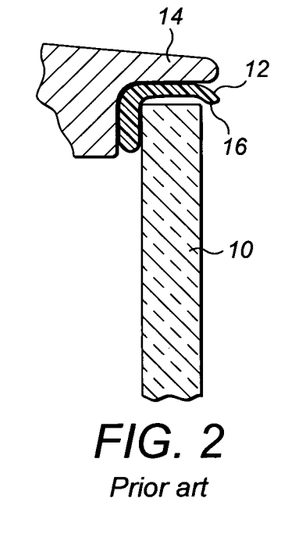
FIG. 2 is a view of a prior art front quarter-light and A-pillar.

The MG Midget Mk III of the early 1970s was an example of a type of vehicle having a frameless main side window which was capable of being lowered and raised, as well as a front quarter-light window mounted to move with the door and main window when the passenger door of the vehicle was opened and closed. The MG Midget and other motor cars of this type and era were prone to misting up due to rudimentary ventilation design and lack of air conditioning and the two front quarter-light windows were provided with a vertical hinge for hinging the quarter-light windows open, as desired, in order to provide extra ventilation for the occupants of the vehicle. More recently, it has become common to provide a front quarter panel of generally triangular shape at the front of a passenger door and window aperture in motor cars and vans, the panel often being of solid black plastic material and being used for mounting wing mirrors to the vehicle. Part of the reason for this construction is that it ensures that there is adequate room within the door for the main side window to be lowered into the door as desired and provides convenient wing mirror location. More recently, it has become the practice with frameless main side windows to place a generally inverted U-shaped seal on the car body into which the main side window may be raised to achieve a good water and air seal. Typically, the main window will be automatically moved down out of this seal when the door handle is operated so that it is possible to open the door without interference between the main window glass and the seal which is mounted to the body of the car. Certain sports and grand tour motor cars including the Aston Martin V8 Vantage (Gaydon plant production) have been provided with a front quarter panel in the form of a fixed quarter-light panel for good styling and/or visibility reasons. FIG. 2 shows generally and highly schematically how the front quarter-light window 10 seals with the seal 12 adjacent to the A-pillar 14 with a very close tolerance in one type of prior art vehicle. Due to the way in which the door and front quarter-light window 10 move generally horizontally when the door is opened and closed, this type of sealing arrangement does not provide a significant overhang 16 of the seal 12 outside the quarter-light window 10 which would interfere with opening a door to which the quarter-light window is mounted. Due to the low pressure which can occur in the region of the outside of the quarter-light when a car is travelling at high speed, in some cars the quarter panel can be sucked outwards causing wind noise or leakage in an undesirable way. Although it has been found that highly skilled craftsmen and women at Aston Martin Lagonda Limited are able to build motor cars to very close tolerances such that a relatively effective seal can be achieved even when the vehicle is travelling at up to extremely high speeds in the region of up to approximately 250 to 300 kilometres per hour thereby placing fairly high aerodynamic loads on the vehicle, nevertheless the building of vehicles with very close tolerances can be difficult or time-consuming even for craftsmen and women of the highest standard and can be impossible for at least some robots.

The present invention aims to alleviate at least to a certain extent the problems of the prior art.

According to a first aspect of the present invention there is provided a window assembly for a vehicle, the assembly including a lowerable quarter panel, and preferably in which at least part of a top edge of the quarter panel is arranged for location adjacent a pillar of a vehicle. Preferably, the panel is a front quarter panel. The pillar may be a roof-support pillar. The pillar may be an A-pillar. This aspect of the invention is highly advantageous. The inventors have found surprisingly that, in certain circumstances, it is possible to provide a door assembly to which the window assembly may be fitted with enough room that the quarter panel may be lowered, at least to a certain extent. In turn this has the substantial advantage that an overlapping inverted and generally U-shaped window seal can be provided on the A-pillar of the vehicle or in the region thereof for engagement with the top edge of the front quarter panel with a substantial overhang exteriorly by the seal such that the assembly can be provided with a very secure seal in the region of the quarter panel which is effective even at extremely high speed and which does not require extremely close tolerances to be observed during the build process. Other advantages are the ability to make the glass (panel) setting process for the quarter glass (panel) more straightforward and quicker and the removal of the need for various tuning steps for setting up the seals to allow them to cope with any discontinuity of front quarter glass (panel) and any (as may be present in preferred examples) main front door glass and division element (e.g. bar) between the front quarter glass (panel) and the main front door glass. By allowing penetration into the seal section (e.g. generally U-shaped window seal) by the quarter glass (panel) this whole area becomes much less sensitive to any body and manufacturing variation.

The quarter panel (or secondary panel) may have a rear edge extending adjacent to or secured to a division bar which extend in a generally upward direction, a main window being located at an opposite edge of the division bar. The quarter panel may have a bottom edge extending along below a top edge of a main door panel of a vehicle.

The quarter panel (or secondary panel) may be substantially triangular. In this case, this panel may have an acute angle at a lower front corner thereof, an acute angle at an upper corner thereof and an obtuse angle at a lower rear corner thereof.

The window assembly may include a main window and a motor (or drive device) for driving the main window between raised and lowered main window positions, wherein a connection system is provided between the motor and the quarter panel for driving the quarter panel between raised and lowered quarter panel positions with the motor. In some embodiments, the motor may be replaced by an equivalent window drive system, such as a manually rotatable handle which can be manually rotated by an adjacent vehicle occupant.

According to a further aspect of the present invention there is provided a window assembly for a vehicle, the assembly comprising a main window and a secondary panel, which is preferably a quarter panel, and a drive device, such as a motor, for driving the main window between raised and lowered main window positions wherein a connection system is provided between the drive device and the secondary panel for driving the secondary panel between raised and lowered secondary panel positions with the drive device. This arrangement is highly advantageous because in many applications there is a closely limited amount of room inside an arrangement such as a door to which the window assembly may be fitted and the use of a single drive unit such as a single motor to drive both the main window and the secondary panel up and down maximises the space available for other components. This also minimises weight thereby providing substantial environmental and performance benefits and reduces cost and complexity.

The secondary panel or quarter panel may comprise a window. The quarter panel may comprise a front quarter-light window. The front quarter-light window may be arranged for location with at least part of a top edge thereof adjacent an A-pillar in a raised position thereof.

The drive device, such as a motor, may be connected by a cable system to a main window glass support, to which the main window is mounted, for driving the main window between the raised and lowered main window positions, the connection system comprising a drive assembly for transmitting drive from the main window glass support to the quarter panel. In this way, drive may be effectively transmitted directly to the main window glass and its support by the cable system for effective movement and control of the relatively heavy main window and drive may be effectively transmitted to the secondary or quarter panel from the main window glass support. This may advantageously allow the main window and secondary or quarter panel to move together substantially in unison, for at least part of the motion of the main window. This is particularly advantageous when the portion of the movement in unison is at a portion of movement range which includes fully up positions of both of the main window and secondary or quarter panel, since this enables set up of both to be calibrated and checked together during vehicle build.

The connection system may include a latch for locking and unlocking drive between the main window and the quarter panel to provide a first travel region in which the main window and the quarter panel are arranged to move together and a second travel region in which the drive between the main window and the quarter panel is disengaged such that movement of the main window does not cause movement of the quarter panel. This advantageously allows a situation in which the quarter panel may be moved just sufficiently down from a fully up position to a position in which it can disengage from a seal located above it on the A-pillar of the vehicle without having to find extra space in the design of the assembly to fully retract the quarter panel down into the door to which the assembly is fitted, while allowing the main window to be fully retracted down into the door in a relatively conventional manner.

The first travel region may extend down from a fully raised configuration in which the main window and the quarter panel are fully raised. The first travel region may extend down to a configuration in which the main window and the quarter panel are positioned approximately 1 to 2 centimetres lower than when in the fully raised configuration. The latch may be configured to unlock the main window and quarter panel at this lower position such that below this position the main window may be freely operated up and down as desired, without altering the position of the slightly lowered quarter panel.

The quarter panel may be mounted with a rear edge thereof secured to a division bar, a front edge of the main window preferably being slidable along inside a channel of the division bar. This arrangement allows for relative motion between the main window and quarter panel.

The latch may comprise an actuation lever which is moveable for selectively transmitting drive from the main window glass support to the division bar. Accordingly, the division bar may be moveable with the quarter panel and in fact may be the component which drives the quarter panel up and down and this is in contrast to all division bars known to the inventors which have been fixed in position.

The actuation lever may be rotatable by movement of the division bar and may have a jaw which is latchingly engageable with an actuation latch pin attached to the main window support, rotation of the jaw enabling escape of the actuation latch pin therefrom for disconnection of drive to the division bar from the main glass support. This arrangement advantageously provides a very reliable unlatching.

The actuation latch pin may be mounted on a bracket member which is mounted to the main glass support and a bias may be provided for biasing the actuation latch pin to a position upon upward movement of the main window in which the actuation latch pin automatically latches into engagement with the jaw. This arrangement advantageously ensures that re-engagement of the drive between the main window and quarter panel window will always occur when the main window is fully raised, and this can be arranged such that it will always happen even if the quarter panel is manually raised from its lowered or indexed lower position by pulling up on it manually before the main window is raised.

A lift pin jaw of the actuation lever may be provided for engaging a lift member, for example a pin, of the division bar for transmitting drive from the actuation lever to the division bar. The actuation lever may be pivotable about a pivot arranged to be fixed in position inside a vehicle door.

According to a further aspect of the invention there is provided a door assembly for a vehicle, the door assembly including a window assembly in accordance with the first and/or second aspect of the invention. The door assembly may comprise a front passenger door of a vehicle.

According to a further aspect of the present invention there is a provided a motor vehicle including a door assembly in accordance with the last aspect of the invention. The motor vehicle may comprise a motor car having two window assemblies as set out above in accordance with aspects of the invention, each said window assembly being mounted in a respective front passenger door thereof.

The present invention may be carried out in various ways and one embodiment of a motor car and door assembly including a window assembly in accordance with the invention will now be described by a way of example only in a non-limiting manner with reference to the accompanying drawings in which.

Figure 7:
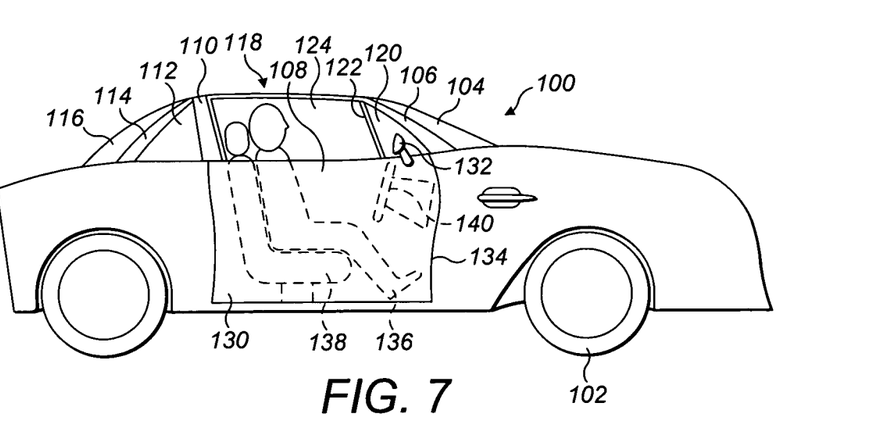
FIG. 7 shows the window assembly of FIG. 1 mounted in a motor car.

FIG. 7 shows a sports car 100 having four wheels 102 having a front windscreen 104, A-pillars 106, two front passenger door assemblies 108, two B-pillars, a pair of rear windows 112, two C-pillars 114 and a rear windscreen 116. Other embodiments are applicable in a wide range of other types of vehicle, including grand tourer, saloon, convertible and SUV types.

The door assembly 108 includes a window assembly 118 having a frameless front quarter-light window 120 separated by a division bar 122 from a frameless main side window 124. The division bar 122 has a rear channel 259 in which a front edge 261 of the main window 124 is slidable. The quarter-light 120 and the main window 124 are frameless in that there is no frame with a seal which engages on top of top edges 126, 128 of these two windows 120, 124 when a door 130 of the door assembly 108 is open and when the main window 124 is fully raised. The main window 124 and quarter-light window 126 are transparent or tinted glass although other materials may be considered. In particular, the quarter-light window 120 may be replaced with an opaque element having a similar shape, such as a black plastic material. FIG. 7 also shows that a wing mirror 132 is mounted on the door 130 adjacent to the quarter-light window 120.

The window 124 and quarter-light window 120 are generally flat although may be slightly curved, such as being outwardly convex for styling and aerodynamic reasons.

Figure 1:
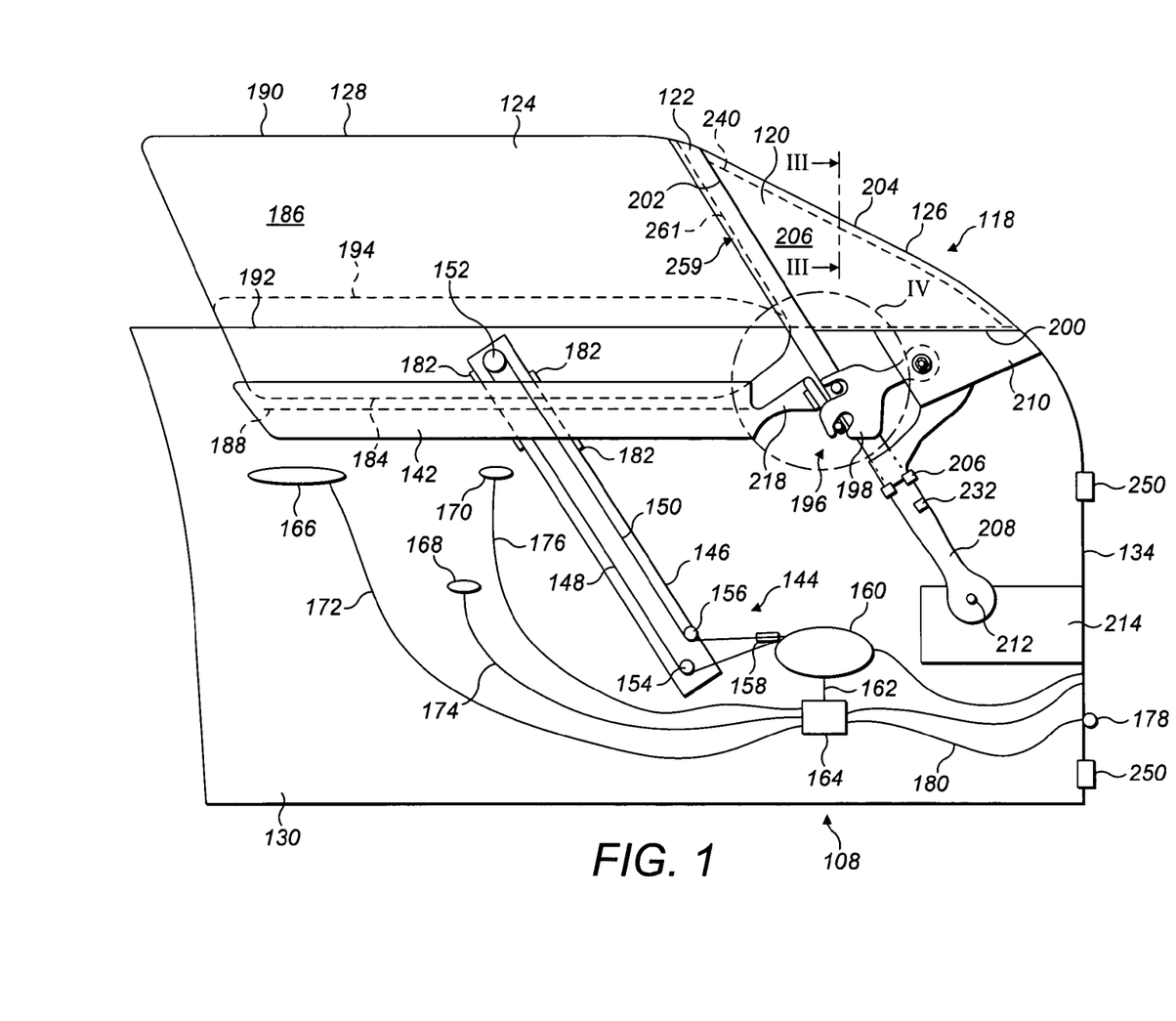
FIG. 1 is a schematic side view of a window assembly in accordance with a preferred embodiment of the invention mounted in a front passenger door for a sports car.

With reference to FIG. 1 and FIG. 7, the door assembly 108 has a front edge 134 of the door 130 and this can be seen to be the front edge 134 rather than a rear edge in FIG. 7 in that a driver 136 of the car 100 sits in a seat 138 of the car 100 oriented facing forward towards a steering wheel 140 of the car 100 and the front windscreen 104.

With reference to FIG. 1, the window assembly 118 which is mounted in the door 130 has a main window glass bracket or support 142 arranged in a generally horizontal configuration which is arranged to be driven up and down with a translational movement by a window regulator assembly 144 which includes a rail 146 fixed to the door 130 connected by cables 148, 150 via pulleys 152, 154, 156 and an automatic length adjuster 158 to a motor 160, the motor 160 being controlled via a signal path 162 by a controller 164 by exterior door handle switch 166, interior door lever switch 168 and interior user-operable window control switch 170 via signal paths 172, 174, 176 respectively. Additionally, the controller 164 may receive control signals from auxiliary input 178 via signal path 180, the auxiliary input 178 being arranged to receive signals from additional devices (not shown) such as a secure car lock switch (not shown) upon activation of which all vehicle windows may be closed and all doors locked, a window jam switch (not shown) such as one mounted in a door seal above the windows 124, 120 for preventing crushing when window operation is jammed such as by being inadvertently blocked by part of a human, or a signal may be received from other devices such as a crash sensor (not shown).

The window glass support 142 is slidably mounted on the rail 146 by bearings 182, and a lower edge 184 of the window glass 186 of the window 124 is secured, such as by adhesive, into a channel 188 of the support 142. Accordingly, the main window glass 186 may be driven up and down in a slidingly translational manner as controlled by the controller 164 between the fully raised configuration shown in FIG. 1 and a fully retracted configuration in which a generally horizontal top edge 190 of the main window 124 is either flush with or slightly below a generally horizontal top edge 192 of the door 130. The dashed line 194 in FIG. 1 shows an example of the position of the top edge 190 of the window glass 124 when in a partially lowered position.

As now will be described, the main window glass bracket or support 142 is arranged to drive the division bar 122 and the quarter-light window 120 up and down via a connection system 196 incorporating a latch 198.

As shown by FIG. 1, the quarter-light 120 is generally triangular and includes a straight lower edge 200 a swept back rear edge 202 which sweeps back from where it meets the lower edge 200 to where it meets a top edge 204 of the quarter-light window glass 206. The division bar 122 and rear edge 202 may be straight, or they may be straight when viewed in the direction of FIG. 1 lateral to the forward direction but slightly outwardly concave when viewed along a longitudinal axis of the car 100 when the door 130 is closed. Therefore the quarter-light window 206 may be generally flat or slightly outwardly convex. The division bar 122 is slidably received by a bearing 206 in a division bar carrier element 208 which is secured to the door 130 by bracket 210 and is also secured by a fastener 212 to a bracket 214 which is also fixed to the door 130. The carrier element 208 is thus fixed in position relative to the door 130 and allows for sliding movement of the division bar 122. The rear edge 202 of the quarter-light window 120 is secured by adhesive to the division bar 122 such that movement of the division bar causes the same sliding movement of the quarter-light window 120.

Figure 5:
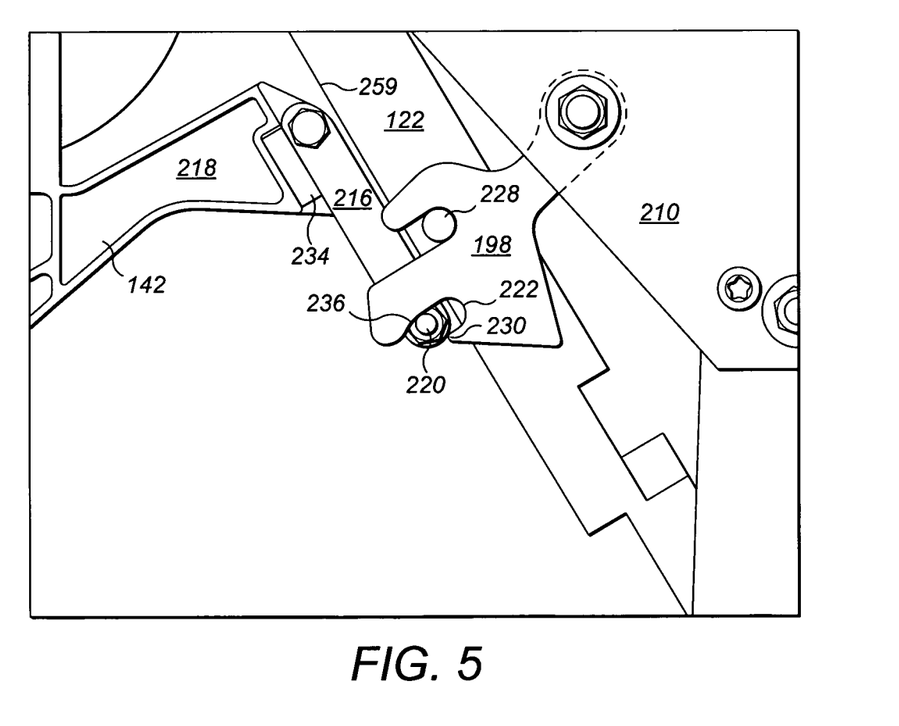
FIG. 5 is a view equivalent to that of FIG. 4 but with a latch of the window assembly at a point near engagement/disengagement.
Figure 6:
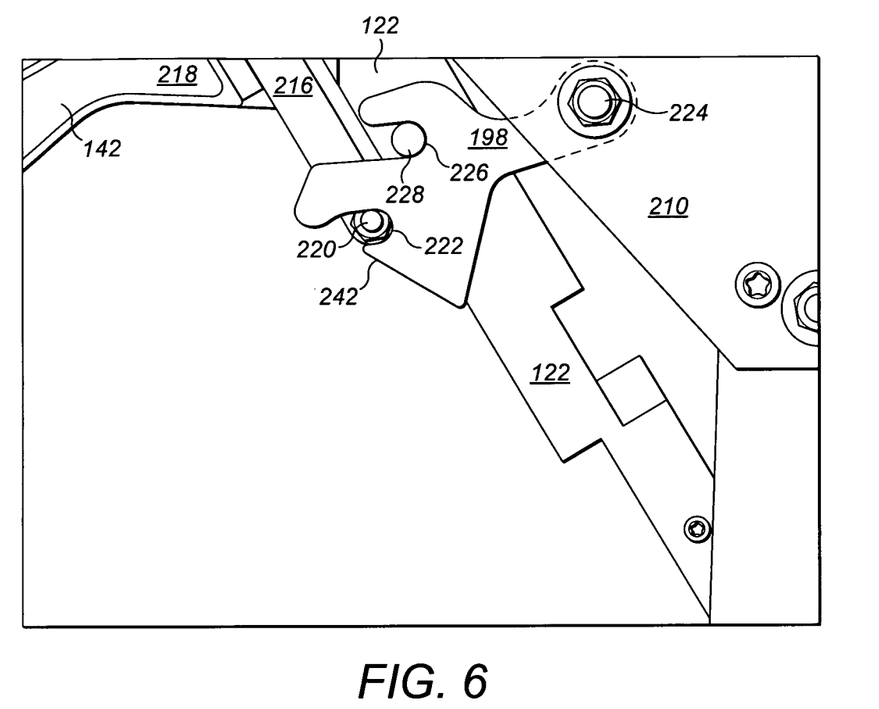
FIG. 6 is a view similar to that of FIG. 4 but with the quarter-light division bar and the main window carrier support both in fully raised positions.

Like FIG. 1, FIG. 6 shows the window assembly 118 with both the main window 124 and quarter-light window 120 in their fully raised positions and FIG. 6 in particularly shows the configuration of the glass bracket or support 142, the latch 198, division bar 122 and bracket 210 when the windows are in this position. It will be seen that a bracket lever 216 is bolted to an end portion 218 of the support 142 adjacent the division bar 122, the lever 216 having an actuation pin 220 located at a distal end thereof for engagement in a jaw 222 of the latch 198 (or actuation lever 198). In turn, the latch 198 or actuation lever 198 is pivotally mounted by a fastener 224 to the bracket 210 and includes a second jaw 236 which engages a lift pin 228 which is secured on the division bar 122. As the window 124 and end portion 218 are driven down from the fully raised position shown in FIG. 6, the actuation pin 220 pushes on the jaw 222 in order to rotate the jaw about the fastener 224. This simultaneously rotates the second jaw 226 about the fastener 224, thereby pivoting down and moving the lift pin 228 so as to lower the division bar 122 and quarter-light window 120 with the window 124. It will be seen from the relative radial distances of the pins 220 and 228 from the pivot at the fastener 224 that as the arrangement moves from the fully raised configuration of FIG. 6 to an intermediate configuration shown in FIG. 5, the main window 124 moves slightly further and at slightly higher speed than the division bar 122. Once the jaw 222 of the actuation lever 198 (or latch 198) has been rotated to the position shown in FIG. 5, the division bar 122 comes down against a bump stop 232 and by virtue of a resilient rubber block bias 234, the bracket lever 216 and pin 220 are able to rotate slightly to jump past a tooth 230 of the jaw 222. As desired, the pin 220 may be arranged either to resiliently jump past the tooth 230 or simply to drop out of the jaw 222 once the actuation lever 198 has rotated sufficiently. It will be appreciated at this point that FIG. 5 actually shows the arrangement while the end portion 228 is lifting the division bar 122 and the pin 220 is engaging against a top surface 236 of the jaw 222.

Figure 4:
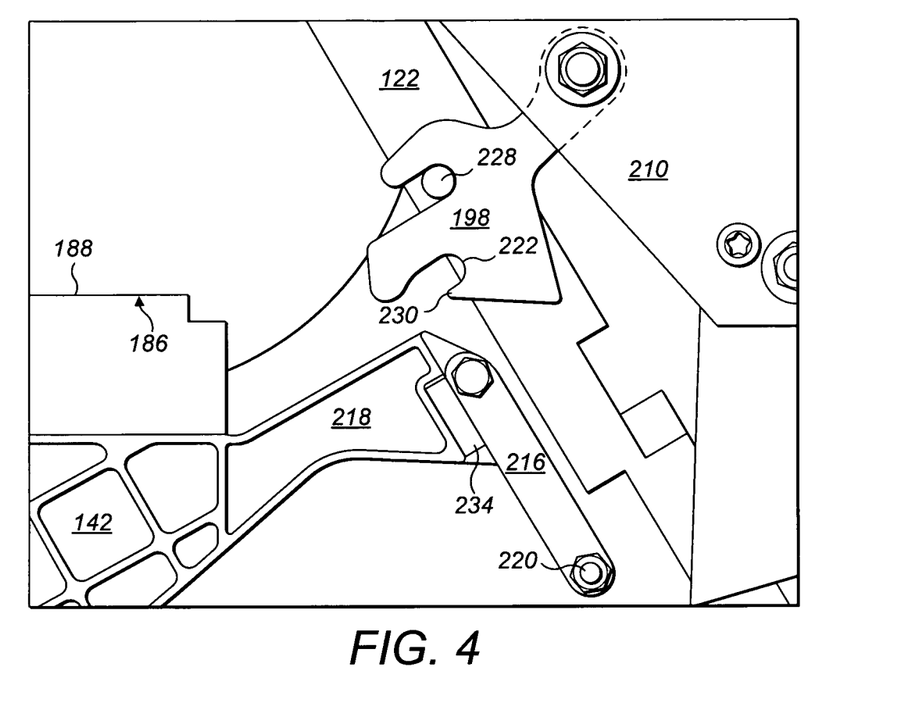
FIG. 4 is an enlarged view of some of the components encircled IV in FIG. 1, but with a quarter-light division bar of the assembly in a fully lowered position and a main window support or "glass bracket" in a further lowered position.

Once the pin 220 has disengaged from the jaw 222, the main window 124 and its support 142 and end portion 216 may continue to travel downwards to a configuration as shown in FIG. 4 in which the pin 220 is spaced below the jaw 222 of the actuation lever 198, the configuration shown in FIG. 4 being functionally the same as the configuration shown in FIG. 1 when the top edge of the window glass 186 is shown in the position marked by the dash line 194. It will be seen that in FIGS. 4 and 5 the division bar 122, lift pin 228 and the actuation lever remain in identical positions relative to the fixed bracket 210 and door therefore 130. The quarter-light 120 is therefore left in an index or dropped position in which it is lowered from its fully raised position by approximately 1 to 2 centimetres with its top edge 204 slightly lower as shown by the dash line 240 in FIG. 1.

Once the main window is raised again to the configuration shown in FIG. 5, the resilient bias 234 positioned on the end portion 218 of the main glass support 142 ensures that the pin 220 latches back into the jaw 222 and the end portion 218 and actuation lever 198 may then continue to be raised back into the fully raised configuration shown in FIG. 6.

If, while the main window is in the lowered unlatched configuration shown in FIG. 4 a user of the vehicle should pull the division bar 122 and quarter-light window 120 back to the raised position of FIG. 6 without raising the window 124, the jaw 222 and actuation lever 198 are accordingly rotated back to the FIG. 6 position. However, once the main window glass 124 is raised again, the resilient bias 234 enables the actuation pin 220 to engage and ride along a slanted bottom edge 242 of the jaw 222 in order to snap over the tooth 230 back into engagement in the jaw 222 and thus to the configuration precisely shown in FIG. 6.

The arrangement of this preferred embodiment is highly advantageous in that only one motor 160 and only one main rail 146 of a window regulator 144 need to be used in order to operate both of the main window 124 and quarter-light window 120 up and down—and up and down by different amounts.

Figure 3:
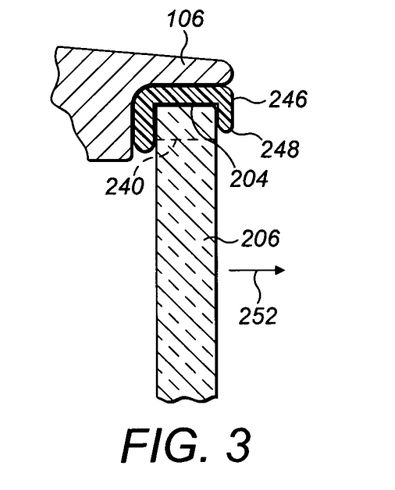
FIG. 3 is a cross-section equivalent to that of FIG. 2, but showing the quarter-light shown in FIG. 1 sectioned on the plane and when it is engaged in an A-pillar seal of the car.

Also, as shown in FIG. 3, a seal 246 between the top edge 204 of the quarter-light window glass 206 and A-pillar 106 of the vehicle may be provided with (an overhang or) a pronounced downwardly extending finger 248 such that a substantial exterior overlap of the finger 248 on the window glass 206 may be achieved when the quarter-light window glass 206 is in the fully raised position shown in FIGS. 1 and 3, the overlap being of such an extent that it may be difficult or not possible to open the door 130 when the quarter-light window glass is in its full raised position. However, when either of the door handle switches 166, 168 are operated, the controller 164 may automatically control the motor to lower the main window glass 186 and the quarter-light glass 206 so that the top edge is in the dashed positions 240 shown in FIGS. 1 and 3 in which there is no longer interference between the glass 206 and the finger 248 such that the door 130 may be opened by rotation about hinges 250 such that the top edge of the quarter-light window 206 may move sideways as shown by the arrow 252 in FIG. 3 past the finger 248 of the seal 246. Accordingly, an extremely effective seal can be achieved between the top edge 204 of the quarter-light window and A-pillar 106 for improved motoring, particularly at very high speeds when low pressure can be present outside the vehicle in the vicinity of the quarter-light, but it is still possible to open and shut the door 130 and the arrangement does not necessarily require manufacture to very close tolerances to achieve good sealing while allowing the door to open and shut.

Additionally, the ability to raise and lower a front quarter panel such as a quarter-light window despite the very limited amount of room inside many vehicle doors, especially at the front thereof may provide additional ventilation benefits. Furthermore, the ability to lower a quarter-light window by only a controlled or index amount as described above is considered highly advantageous because this can prevent undesirable occupant buffeting by wind and/or undesirable interior air pressure cycling or "drumming" as may undesirably be experienced with types of poorly-designed sunroof Various modifications may be made to the embodiments described without departing from the scope of the invention as defined by the accompanying claims as interpreted under Patent Law.

The invention claimed is:

1. A window assembly for a vehicle, comprising:
    a lowerable quarter panel, at least part of a top edge of the quarter panel being arranged for location adjacent a pillar of the vehicle;
    a main window; and
    a drive device for driving the main window between raised and lowered main window positions, wherein
    a connection system is provided between the drive device and the quarter panel for driving the quarter panel between raised and lowered quarter panel positions with the drive device;
    the drive device is connected to a main window glass support to which the main window is mounted, for driving the main window between the raised and lowered main window positions; and
    the connection system comprises a drive assembly for transmitting drive from the main window glass support to the quarter panel.

2. The window assembly as claimed in claim 1 wherein the quarter panel comprises a front quarter-light window, wherein the pillar comprises an A-pillar of the vehicle, and wherein at least part of the top edge of the front quarter-light window is arranged for location adjacent the A-pillar.

3. The window assembly as claimed in claim 1 wherein the connection system includes a latch for locking and unlocking drive between the main window and the quarter panel to provide a first travel region in which the main window and the quarter panel are arranged to move substantially together and a second travel region in which drive between the main window and the quarter panel is disengaged such that movement of the main window does not cause movement of the quarter panel.

4. The window assembly as claimed in claim 3 wherein the first travel region extends down from a fully raised configuration in which the main window and the quarter panel are fully raised.

5. The window as claimed in claim 4 in which the first travel region extends down to a configuration in which the main window and the quarter panel are positioned approximately 1 to 2 cm lower than when in the fully raised configuration.

6. The window assembly as claimed in claim 1, wherein the quarter panel is mounted with a rear edge thereof secured to a moveable division bar; and-wherein a front edge of the main window is slideable inside a channel of the division bar.

7. The window assembly as claimed in claim 3, wherein the latch comprises an actuation lever which is moveable for selectively transmitting drive from the main window glass support to a division bar.

8. The window assembly as claimed in claim 7 wherein the actuation lever is rotatable by movement of the division bar, and one of the actuation lever and the main window glass support has a jaw which is latchingly engageable with an actuation latch pin attached to other of the actuation lever and the main window glass support, rotation of the jaw enabling escape of the actuation latch pin therefrom for disconnection of drive to the division bar from the main window glass support.

9. The window assembly as claimed in claim 8 wherein the actuation latch pin is mounted on a bracket member which is mounted to the main glass support, and in which a bias is provided for biasing the actuator latch pin to a ready position in which, upon upward movement of the main window, the actuation latch pin latches into engagement with the jaw.

10. The window assembly as claimed in claim 9 in which the bias is arranged to bias the latch pin to the ready position for engagement with the jaw.

11. The window assembly as claimed in claim 8 wherein a lift pin jaw of one of the division bar and the actuation lever engages a lift member of the other of the division bar and the actuation lever for transmitting drive from the actuator lever to the division bar; and wherein the actuation lever is pivotable about a pivot arranged to be fixed in position in a vehicle door.

12. The window assembly as claimed in claim 1 further comprising:
a controller for lowering the quarter panel, wherein the controller is arranged to lower the quarter panel in response to a signal received from a switch.

13. A door assembly for a vehicle, the door assembly comprising:
a passenger door assembly including a window assembly as claimed in claim 1.

14. A motor vehicle comprising:
a car including a passenger door assembly as claimed in claim 13.

15. The motor vehicle as claimed in 14 further comprising a seal positioned between the top edge of the quarter panel and the pillar of the vehicle.

16. The motor vehicle as claimed in claim 15 wherein the seal has an overhang portion which overhangs the top edge of the quarter panel when the quarter panel is in a fully raised position in which it engages the seal.

17. The motor vehicle as claimed in claim 16 further comprising a controller for lowering the quarter panel out of interference with the overhang for opening the front passenger door assembly.

18. The motor vehicle as claimed in claim 17 wherein the controller is arranged to lower the quarter panel out of interference with the overhang in response to a signal received from a switch.

19. The window assembly as claimed in claim 1 further comprising a seal arranged to seal along at least a part of the top edge of the quarter panel, the seal having an overhang portion arranged to overhang the top edge when the quarter panel is in a fully raised position.

20. The door assembly as claimed in claim 13 further comprising a seal arranged to seal along at least a part of the top edge of the quarter panel, the seal having an overhang portion arranged to overhang the top edge when the quarter panel is in a fully raised position.

* * * * *